July 9, 1968 W. GREATBATCH 3,391,697

RUNAWAY INHIBITED PACEMAKER

Filed Sept. 20, 1965 3 Sheets-Sheet 1

INVENTOR
WILSON GREATBATCH
BY Bernard Olcott
ATTORNEY

INVENTOR
WILSON GREATBATCH
BY Bernard Olcott
ATTORNEY

RUNAWAY INHIBITED PACEMAKER

Filed Sept. 20, 1965

INVENTOR
WILSON GREATBATCH
BY
ATTORNEY

United States Patent Office 3,391,697

Patented July 9, 1968

3,391,697

RUNAWAY INHIBITED PACEMAKER

Wilson Greatbatch, Clarence, N.Y., assignor to Medtronic, Inc., Minneapolis, Minn., a corporation of Minnesota Filed Sept. 20, 1965, Ser. No. 488,387
13 Claims. (Cl. 128—422)

ABSTRACT OF THE DISCLOSURE

A cardiac Pacemaker which is adapted to generate pulses at a first repetition rate and which contains runaway inhibiting circuitry which prevents malfunction of the Pacemaker from applying pulses to the output circuit at a rate greater than a second repetition rate which is higher than the first. Two modifications are shown, the first containing circuitry which reduces the magnitude of the output pulses when the repetition rate exceeds the first rate and approaches the second rate, and the second containing circuitry which reduces the repetition rate of the pulses appearing at the output circuit below the repetition rate generated by the pulse generator when the repetition rate of the pulse generator exceeds the first rate.

This invention relates generally to implantable cardiac Pacemakers and more specifically to an improved cardiac Pacemaker having an output which in the first instance is reduced in magnitude or frequency and then disabled or inhibited should the frequency rate of its generated Pacemaker pulses approach a predetermined maximum safe level.

My previous invention, U.S. Patent No. 3,057,356, on which this invention is an improvement, teaches and claims a battery-operated cardiac Pacemaker suitable for long-term implantation within the human body. An inherent characteristic of the feed-back blocking type of oscillator employed in such Pacemakers is that as the batteries become exhausted, the output of the Pacemaker will drop and the Pacemaker frequency rate will change slightly. Before the frequency rate increases enough to cause a dangerous tachycardia, the output of the Pacemaker will generally have dropped far enough to stop stimulating the heart. Thus, the device is fail-safe from normal battery exhaustion.

However, such a device, and particularly the oscillator, is not fail-safe from certain other malfunctions. Among these are: failure of the oscillator transistor, short-circuit of the oscillator base capacitor, a reduction in inductance of the transformer primary winding, etc. The accompanying malfunctions can conceivably induce a dangerous tachycardia. This invention is directed to provide a solution for such problem.

An improved Pacemaker with supplementary circuitry to inhibit such frequency runaway should be as independent as possible of the remainder of the Pacemaker circuitry, should add as few components as possible, should derive its activation directly from the pulse generating portion of the circuitry, and should not in itself be able to fail in such a way as to increase the frequency rate of the Pacemaker pulses and thereby provide another incidence for tachycardia. While the supplementary circuitry cannot prevent circuit component failures and some types of circuit malfunctions, it should have the desirable feature of eliminating some or all of the Pacemaker pulses upon serious increase in the Pacemaker pulse rate by inhibiting the Pacemaker pulses, since absence of Pacemaker stimulation is far less dangerous than Pacemaker stimulation at an abnormally high frequency rate. Ideally, the output of the Pacemaker should more or less gradually decrease as the frequency rate increases above a first predetermined level, such as perhaps 100/min., but should drop to near zero at some higher, but still safe, second predetermined level of frequency rate, such as 120/min.

An object of this invention is to provide an improved Pacemaker which will cease to provide heart stimulating electronic pulses when the frequency of the generated pulses becomes excessive due to Pacemaker malfunction.

Another object of this invention is to provide an improved Pacemaker having an output such that, as the rate of its generated pulses increases beyond a first predetermined level, the output amplitude will start to be reduced and will thereafter be reduced rapidly with further increasing frequency of the generated pulses, the output amplitude becoming zero at a second predetermined level corresponding to the maximum safe heart rate, thereby to stop all stimulation of the heart when such stimulation might become harmful. A further object of this invention is to provide an improved Pacemaker having an output such that as the rate of its generated pulses increases beyond a first predetermined level, the output pulse repetition rate is reduced below the generated pulse repetition rate, the output repetition rate approaching a second predetermined level, higher than the first, as a limit.

Still another object of this invention is to provide an improved Pacemaker with runaway inhibitor circuitry which is activated in such a way that no single mode of Pacemaker failure can simultaneously disable the runaway inhibitor and increase the Pacemaker rate.

Yet another object of this invention is to provide an improved Pacemaker with a runaway inhibitor supplementary circuit whose activation is derived directly from the rate-producing circuit elements, so that the mere generation of the tachycardia itself activates the runaway inhibitor circuitry without having to rely on conduction through any other circuit elements.

According to the invention there is provided an implantable cardiac Pacemaker which comprises an implantable semiconductor pulse generator, a power supply, a pair of output electrodes and means coupled between the power supply and the output electrodes for preventing pulses being applied to the output electrodes at a frequency rate above a predetermined frequency.

As an important feature of one embodiment of the invention, such means also reduces the magnitude of the generated pulses upon the output electrodes when the frequency rate of the pulse generator approaches the predetermined frequency.

Other objects and features of the present invention will be set forth or apparent in the following description and claims and illustrated in the accompanying drawings, which disclose by way of example and not by way of limitation, in a limited number of embodiments, the principle of the invention and structural implementations of the inventive concept.

Figure 1:
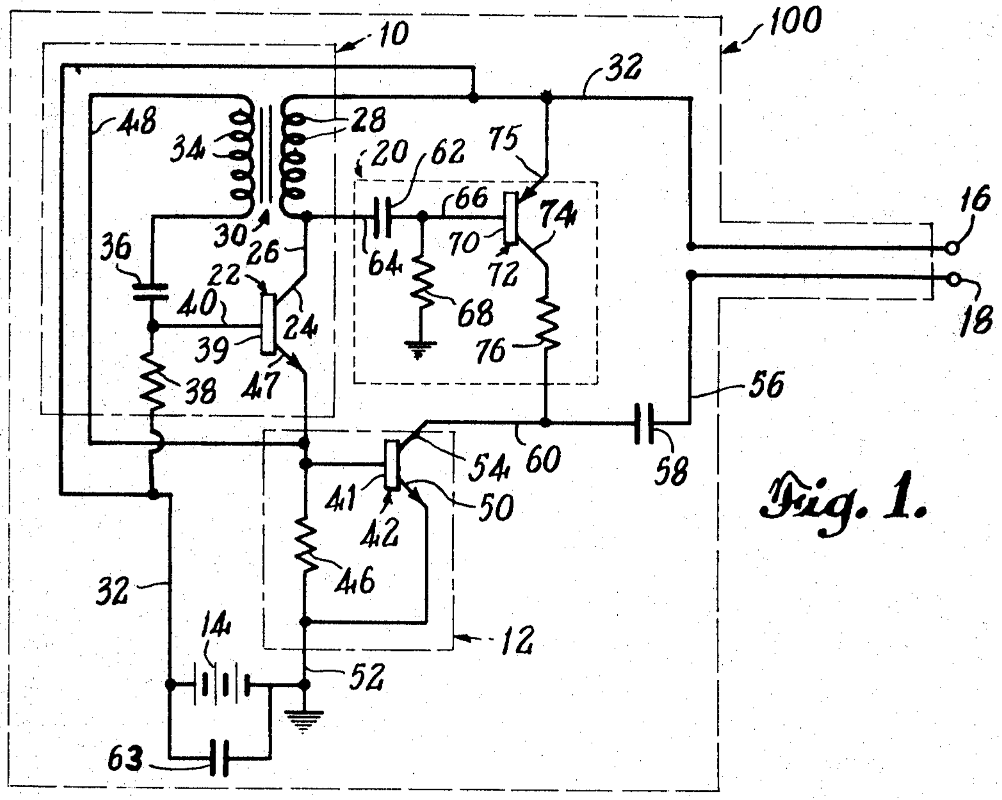
FIG. 1 is a schematic diagram of one embodiment of an improved Pacemaker according to the present invention.

In FIG. 1, there is shown a free-running feedback blocking oscillator 10 driving a saturable switching or amplifying stage 12, both 10 and 12 being powered by battery 14 for generating regular periodic pulses of approximately one pulse per second upon electrodes 16 and 18 which are surgically placed in contact with the heart of a patient. Such elements of FIG. 1 are similar in construction and function which provide stimulation for a defective heart in the manner of the Pacemaker disclosed in my U.S. Patent No. 3,057,356. Adidtionally, FIG. 1 illustrates supplementary runaway inhibitor circuitry 20 which reduces the amplitude of the generated pulses upon electrodes 16 and 18 as the frequency of the oscillator 10 exceeds a first predetermined safe frequency rate and thereafter rapidly reduces the amplitude of the pulses to zero when the frequency rate of oscillator 10 approaches a second predetermined maximum safe frequency rate.

Oscillator stage 10 includes a transistor 22 having a collector electrode 24 connected by a lead 26 to one side of primary winding 28 of a feed-back transformer 30. The other side of primary winding 28 is connected to the positive side of battery 14 and to electrode 16 by a lead 32. One side of a secondary winding 34 of transformer 30 is connected to the positive side of battery 14 through a capacitor 36 in series with a resistor 38, such latter two components constitutng a R-C circuit to control the timing and frequency of the generated Pacemaker pulses and to this end, base electrode 39 is connected to the junction of capacitor 36 and resistor 38 by a lead 40. The other side of secondary winding 34 is connected to base electrode 41 of a switching output transistor 42, one side of a bias resistor 46 and emitter electrode 47 of oscillator transistor 22 by a common lead 48. The other side of resistor 46, emitter 50 of switching output transistor 42 and the negative side of battery 14 are grounded by a common lead 52. When collector electrode 54 of transistor 42 is connected to the positive side of battery 14 through the runaway inhibitor circuitry 20, Pacemaker pulses depending upon circuit parameters of 36 and 38 are provided upon output electrodes 16 and 18, the latter being connected through a lead 56, a capacitor 58 and a lead 60 to collector electrode 54, in a manner similar to the invention disclosed in my U.S. Patent No. 3,057,356. For increasing the useful life of battery 14, a capacitor 63 is shunted thereacross which is charged at a relatively low current rate from battery 14 in the intervals between generated pulses and provides a relatively large current required by the 2 millisecond Pacemaker pulse which stimulates the heart. Thereby, the battery 14 is subjected to average instead of peak current drains for supplying the instantaneous power required to pulse and stimulate the defective heart.

Runaway inhibitor circuit 20 includes a capacitor 62, one side of which is connected by a lead 64 to lead 26 and the other side of which is connected by a lead 66 to one side of a biasing resistor 68 and a base electrode 70 of a switching transistor 72. The other side of resistor 68 is grounded. The collector 74 and emitter 75 of switching transistor 72 are connected to one side of a resistor 76 and the positive side of battery 14, respectively, while the other side of resistor 76 is connected to lead 60.

Figures 3A, 3B, 3C, 3D, 3E:
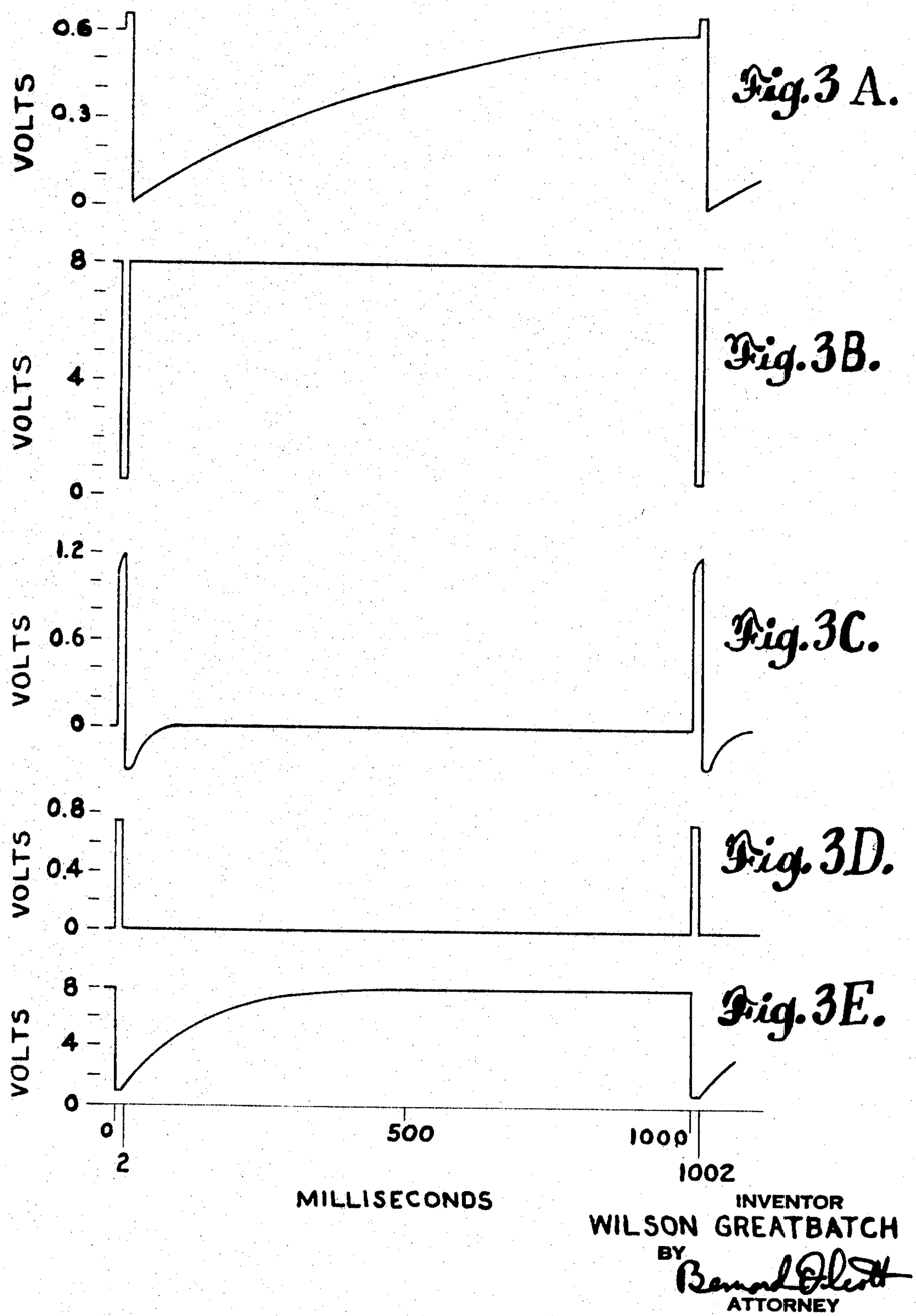
FIGS. 3A to 3I illustrate the wave forms existing at selected locations to explain the operation of the embodiment according to FIG. 1.

The manner of operation of the improved Pacemaker schematically diagrammed in FIG. 1 will be explained with the aid of wave form diagram at various selected points in FIG. 1 as shown in FIGS. 3A to 3I. As disclosed and explained in my U.S. Patent No. 3,057,356, a saw-tooth voltage wave form exists at the base 39 of the oscillator transistor 22 which falls quickly to approximately zero volts immediately upon cessation of a 2 millisecond Pacemaker pulse and then rises exponentially to 0.6 volt in about 1 second, driving transistor 22 into conduction and initiating another Pacemaker pulse. The voltage wave form appearing on base electrode 39 is shown in FIG. 3A, the period or frequency of which is controlled by the R-C circuit consisting of capacitor 36 and resistor 38.

FIGS. 3A to 3C explain the operation of stage 10 as an uninhibited free-running feed-back blocking oscillator. The voltage wave form existing on the collector electrode 24 of oscillator transistor 22 is shown in FIG. 3B and by feed-back action of transformer 30, the voltage impressed upon the secondary winding 34 is shown in FIG. 3C. When oscillator 22 is driven into saturation, the voltage at its base electrode 39 can rise but slightly above 0.6 volt as shown in FIG. 3A.

Figures 3F, 3G, 3H, 3I, 3J, 3K:
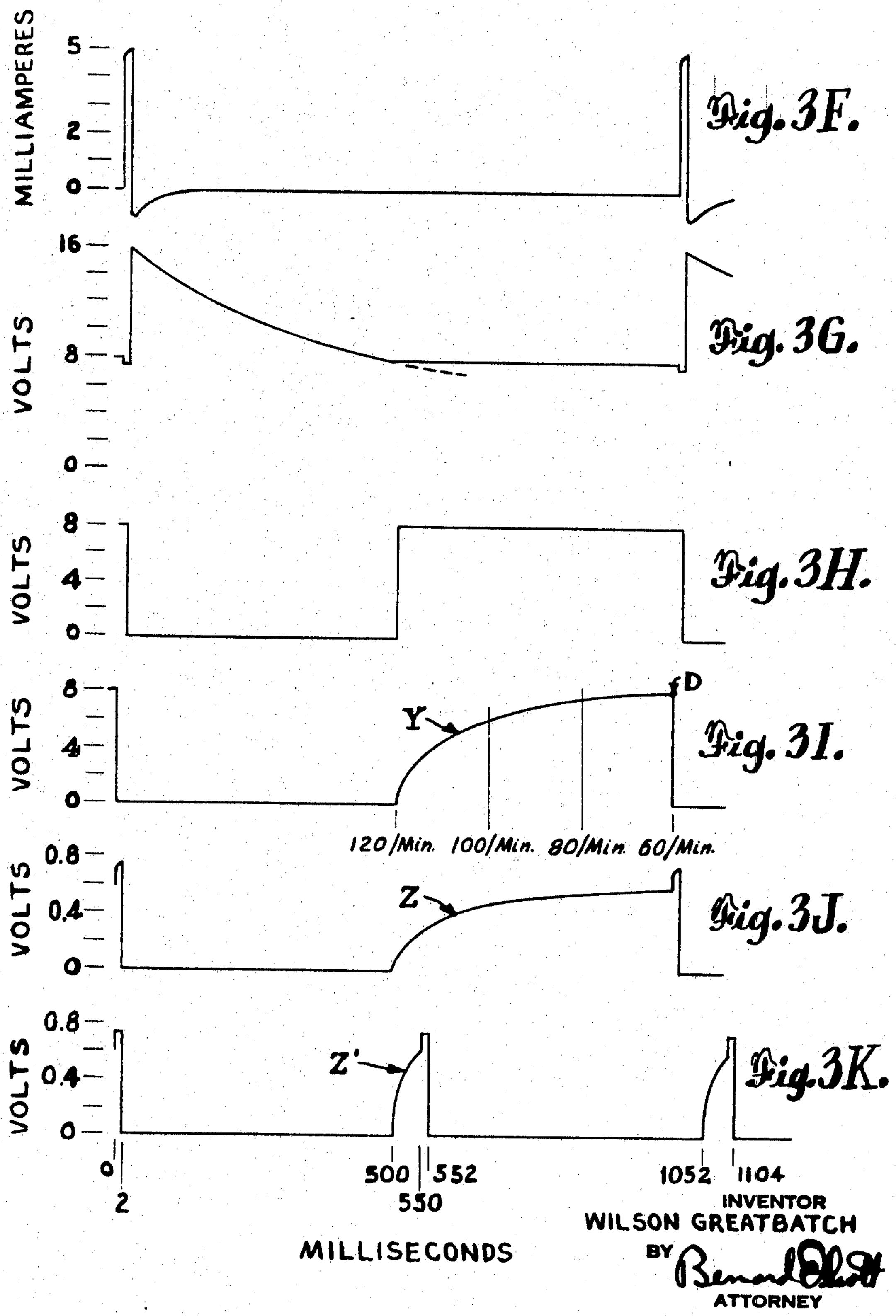
FIGS. 3J and 3K illustrate the wave form at selective locations in FIG. 2 to explain the operation of the second embodiment of the invention.

The corresponding voltage wave form at emitter electrode 47 of oscillator transistor 22 is shown in FIG. 3D. The output pulse appearing at the emitter 47 of oscillator transistor 22 is applied to base electrode 41 of switching output transistor 42 which is quickly driven into saturation to provide Pacemaker pulses on electrodes 16, 18 and to simultaneously charge capacitor 58. The corresponding voltage wave form appearing on lead 60 is illustrated in FIG. 3E and the current flowing therein to electrode 18 is shown in FIG. 3F. When transistor 42 is cyclically saturated by oscillator 10 to provide the Pacemaker pulses upon electrodes 16 and 18, lead 60 is grounded during the pulse interval and thereby capacitor 58 is rapidly charged to the battery potential. Between Pacemaker pulses, capacitor 58 slowly discharges through resistor 76 and transistor 72 (which we have so far considered to be conductive). In FIG. 3F, the relatively high intensity current pulses flowing through the heart circuit charge capacitor 58. In the interval between pulses, capacitor 58 slowly discharges in the heart circuit through resistor 76 when switching transistor 72 is saturated. Capacitor 58 acts as a charging capacitor charging in one polarity sense by the Pacemaker pulses and discharging between Pacemaker pulses to provide a reversed current through electrodes 16, 18. It is believed that such reversal of current through the heart circuit is beneficial in that it prevents the plating of any metal upon the patient's heart which may be the case if only a unidirectional current was passed therethrough.

The mode of operation as explained immediately above when runaway inhibitor circuit 20 provides a conductivity path from lead 32 to lead 60 is similar to the mode of operation of the Pacemaker in my U.S. Patent No. 3,057,356.

The operation of the runaway inhibitor circuit 20 will now be explained. Neglecting for a moment the voltage generated on collector electrode 24 of oscillator transistor 22 as shown in FIG. 3B, switching transistor 72 would ordinarily be maintained in a conducting mode by a predetermined biasing voltage on its base electrode 70 established by the biasing current flowing through the biasing resistor 68. When the voltage of collector electrode 24 drops negatively at the beginning of each Pacemaker pulse as shown in FIG. 3B, the right hand side of capacitor 62 becomes positively charged through saturated transistor 72 to the supply voltage which is assumed to be +8 volts. But when the trailing edge of the Pacemaker pulse is returned in a positive direction to the supply voltage, the right hand side of capacitor 62 which was at a +8 volts potential is momentarily boosted to approximately a +16 volts potential as shown in FIG. 3G to drive transistor 72 into a cut-off state. However, the charge and voltage on capacitor 62 drains exponentially through resistor 68 and transistor 72 is driven back into saturation when its base electrode voltage reaches a point about 0.6 volt below the supply voltage and the parameters are adjusted so this occurs in approximately 0.5 second. When transistor 72 becomes conducting, it supplies a conductivity path to slowly discharge capacitor 58 through resistor 76 in the time interval between Pacemaker pulses when transistor 42 is unsaturated. Subsequently, at the instant of saturation of transistor 42, the magnitude of the generated pulse on electrodes 16, 18 depends upon the quantity of charge which is withdrawn from capacitor 58 by the prior saturation of transistor 72. Circuit parameters are adjusted so that capacitor 58 is completely discharged in 0.5 second to provide maximum magnitude Pacemaker pulses when they occur at a rate of 60 pulses per minute. The magnitude of the Pacemaker pulses will now be considered as the frequency rate of oscillator 10 increases.

As a result of the cyclic unsaturating and saturating of transistor 72 at a fixed rate as controlled by 62 and 68, this switching characteristic for discharging capacitor 58 can be represented by FIG. 3H. The voltage appearing on collector 54 of transistor 42 as controlled by the discharging of capacitor 58 can be represented by the wave form shown in FIG. 3I.

As illustrated in FIGS. 3H and 3I, when the generated Pacemaker pulse rate is 60 per minute, transistor 72 is saturated half the time. In FIG. 3I, lead 60 becomes grounded by saturation of 42 and remains at ground potential until transistor 72 becomes saturated to provide a discharge path for 58, such event always starting a fixed time interval, of say 500 milliseconds (as determined by 62 and 68), after each Pacemaker pulse. Hence, it can be seen that if the frequency rate of the Pacemaker pulses as provided by oscillator 10 is 60 per minute, or 1 per second, capacitor 58 will deliver its maximum stored energy as represented by point D on curve Y. However, if the frequency rate of the generated Pacemaker pulses by oscillator 10 increases to 100 per minute, charging capacitor 58 will not be capable of discharging completely before it will be again charged through the patient's heart circuit by such 100 per minute pulses appearing on collector electrode 54 of transistor 42. Hence it can be seen that while saturation of the switching transistor 72 will instantly enable amplifier transistor 42 to provide an output pulse upon its collector electrode at the frequency of the oscillator section 10, the effect of such higher frequency generated pulse rate will prevent capacitor 58 from fully discharging between pulses. Hence, the Pacemakes pulses which appear on electrodes 16 and 18 will diminish in intensity as the Pacemaker frequency rate increases above a predetermined rate such as 80 pulses per minute. If the Pacemaker pulses increase above 100 per minute and approach 120 per minute there will be a further reduced intensity of the output Pacemaker pulses so that such higher frequency Pacemaker pulses will become too weak to stimulate the heart. As shown by curve Y in FIG. 3I, when the Pacemaker pulse rate reaches 120 per minute, the Pacemaker pulses will become completely arrested or inhibited.

According to the invention concept hereinabove disclosed, if the beginning of the slow discharging of capacitor 58 is delayed for 0.5 second, then the output of the improved Pacemaker at heart rates in the range of 60 to 80 per minute would be practically unaffected. However, at rates of 120 per minute and above, capacitor 58 could not start its slow discharge until after the time for the next pulse had arrived. Since the reduction of the charge on capacitor 58 determines the magnitude of the Pacemaker current pulses to stimulate the patient's heart, it cannot stimulate the heart if it can never dissipate any charge. Further, if the charging current circuit is adjusted so that about 0.4 second is required to accomplish most of the capacitor discharging, then some effect of the runaway inhibitor would begin to be seen at heart rates of 80 per minute. Namely, Pacemaker pulse output would begin to drop off somewhat at such rate. As the rate increases higher, the Pacemaker pulse intensity would drop faster, until the Pacemaker pulses decay to zero at a rate of about 120 per minute. Thus a runaway of the Pacemaker for any reason whatsoever would be converted to an arrest after the rate had exceeded 120 per minute.

Figure 2:
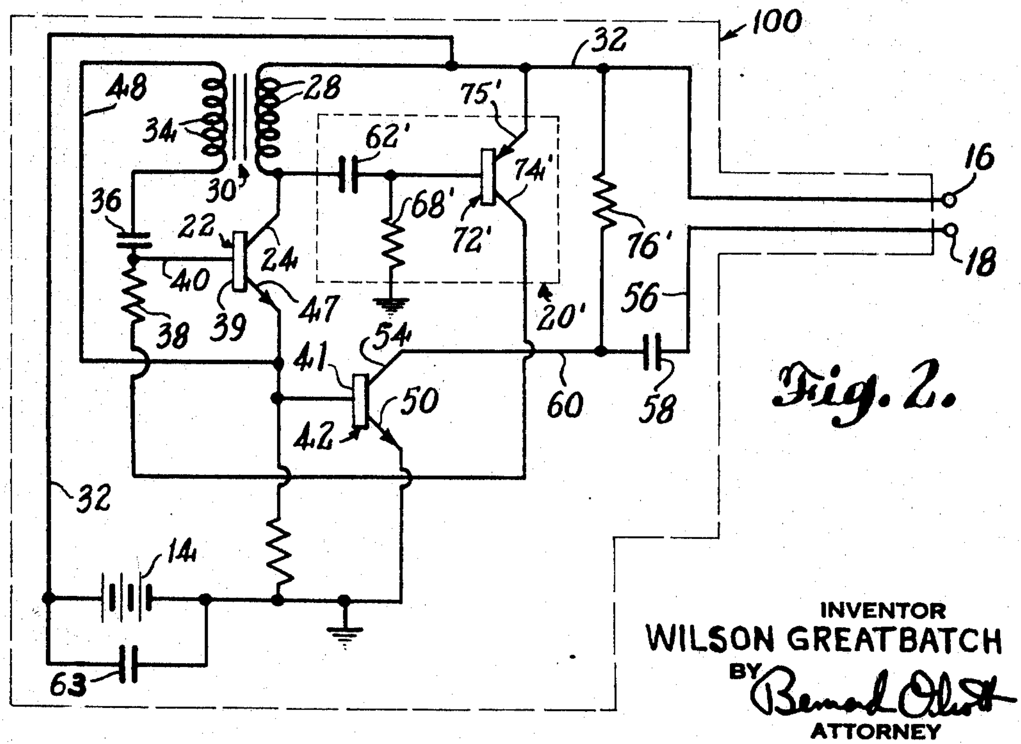
FIG. 2 is a schematic diagram of another embodiment of an improved Pacemaker according to the invention.

Another embodiment of the invention is shown in FIG. 2 wherein the desired time delay is applied to the base electrode 39 of oscillator transistor 22 in such a way as to remove the voltage normally applied to the oscillator base resistor 38 for 0.5 second following each Pacemaker puse. This has the effect of adding a discrete time increment to the charge time of the R-C circuit consisting of the same resistor 38 and capacitor 36 so that the time interval between the pulses is the sum of both time increments.

FIG. 2 is a modification of FIG. 1 wherein the end of resistor 38 in FIG. 1 which is normally connected to the positive side of battery 14 is connected instead to the collector electrode 74' of switching transistor 72'. Also, in FIG. 2, the collector electrode 54 of the output transistor 42 is connected uninterruptedly to the positive side of battery 14 through resistor 76 and hence the discharge path for capacitor 58 remains uninterrupted. Accordingly, the voltage wave form at the base of switching transistor 72' is similar to the wave form 3G and the voltage applied to the R-C circuit of 38 and 36 is similar to the wave form 3H. However, the voltage wave form at the base electrode 39 of oscillator transistor 22 in FIG. 2 will appear as the wave form FIG. 3J instead of as FIG. 3A in respect of FIG. 1 as explained hereinbefore with respect to FIG. 1, the discharging of capacitor 58 for a Pacemaker rate of 60 per minute, is illustrated in FIG. 3I by curve Y in the interval 500 to 1000 milliseconds. If the Pacemaker rate increases to 80 per minute, the discharging of capacitor 58 is stopped at 750 milliseconds and the magnitude of the Pacemaker pulse (which is proportional to its state of discharge) is but slightly reduced.

Referring to FIG. 3J and FIG. 2, transistor 72' is unsaturated for the fixed time interval 2 to 500 milliseconds as determined by capacitor 62' and resistor 68'. The saturation of 72' at 500 milliseconds suddenly applies battery voltage to the R-C circuit 36, 38 which applies a capacitor charging voltage characteristic Z to the base electrode 39 of oscillator transistor 22 to initiate a 2 millisecond Pacemaker pulse every time the base 39 voltage reaches 0.6 volt. In FIG. 3J, this occurs every 1.0 second to illustrate the normal desired generated Pacemaker pulse rate of 60 per minute.

FIG. 3K illustrates the Pacemaker output response under an abnormal faulty condition which would ordinarily increase the pulse rate ten times (or 600 per second). Regardless of such fault, the Pacemaker response in the time interval 0 to 500 milliseconds follows the normal response of FIG. 3J. However, the saturating potential on base 39 is reached in 50 milliseconds (under the assured condition of 600 pulses per minute) instead of 500 milliseconds. But since each Pacemaker pulse whether normal or abnormal, is followed by a fixed interval of 500 milliseconds, the output pulse rate cannot exceed 120 per minute, or a double fold increase as compared to the expected runaway rate of ten fold.

Accordingly, Pacemaker pulses appear on electrode 16 and 18 without appreciable frequency change when the Pacemaker frequency rate is between 60 per minute and approximately 80 per minute. When the frequency of the Pacemaker pulses increases toward 120 per minute, the delay of the inhibiting circuitry 20' will control and limit the output frequency to a maximum of 120 per minute. Pacemaker pulses tending to occur at a rate of 80 to 100 per minute will appear at the output electrodes 16 and 18 with a somewhat lower pulse rate. But if the capacitor 36 should leak to the extent that the R-C time constant is reduced to 0.1 second, the Pacemaker period interval could still be no less than 0.6 second. Thus where a Pacemaker according to my U.S. Patent No. 3,057,356 which has no runaway inhibitor circuitry would speed up in frequency to perhaps 600 per minute under the same conditions, a Pacemaker according to FIG. 2 could speed up to only 100 per minute.

Comparing the Pacemaker of FIG. 1 with FIG. 2, we find that in both embodiments, the frequency rate of the Pacemaker pulses on electrodes 16, 18 cannot exceed 120 per minute. Also that in the Pacemaker according to FIG. 1 the intensity of the Pacemaker pulses decreases as its frequency changes from 60 to 120 per minute with zero output at 120 per minute while in FIG. 2 the output pulse intensity remains constant but the frequency rate thereof as it will appear at electrodes 16, 18 is reduced. The Pacemaker of FIG. 1 but not FIG. 2, is runaway proof against such failure modes as a defective oscillator transistor or any other failure mode where current from an outside source can gain access to the base of the oscillator transistor.

It is to be understood that in both FIGS. 1 and 2, the output electrode 16 can be connected directly to ground in the manner of my U.S. Patent No. 3,057,356 instead of to the positive side of battery 14 as shown in FIGS. 1 and 2.

So that the entire Pacemakers of FIGS. 1 and 2 can be implanted within the human body, all the components shown in FIGS. 1 and 2 (with the exceptions of output electrodes 16 and 18, but including the cable extending to 16, 18) and battery 14 (which may be a mercury battery or other suitable supply such as rechargeable batteries, nuclear or biological power sources) are enveloped with a moisture-proof and reaction-free material 100 such as silicon rubber or other suitable plastic.

The transistors shown in FIGS. 1 and 2 may be either silicon transistors, germanium transistors, field effect transistors, signal control rectifiers, PNPN switches or other suitable solid state devices.

While there has been described and pointed out the fundamental novel features of the invention as applied to preferred embodiments, it will be understood that various omissions and substitutions and changes in the form and details of the devices illustrated and its operation may be made by those skilled in the art, without departing from the spirit of the invention. It is the intention, therefore, to be limited only as indicated by the scope of the following claims.

I claim:

1. A cardiac Pacemaker which comprises a semiconductor pulse generator adapted to normally generate pulses at a first predetermined frequency, a power supply coupled to said pulse generator, a pair of Pacemaker output terminals coupled to said pulse generator and runaway inhibit means coupled to said pulse generator for preventing Pacemaker malfunction from causing pulses to be applied to said Pacemaker output terminals at a frequency rate above a second predetermined frequency higher than said first frequency.

2. A cardiac Pacemaker according to claim 1 wherein said runaway inhibit means also reduces the magnitude of said pulses upon said output terminals when the frequency rate of said pulse generator exceeds said first frequency and approaches said second frequency.

3. A cardiac Pacemaker according to claim 1 including a capacitor connected in series between one of said output terminals and said pulse generator and wherein said runaway inhibit means, by a predetermined time period, delays connecting said capacitor across said output terminals in the time interval between pulses.

4. A cardiac Pacemaker according to claim 1 including a capacitor and wherein said runaway inhibit means includes a switching semiconductor having a pair of output electrodes, a resistor and a timing circuit coupled between said pulse generator and said switching semiconductor, said capacitor being connected in series with said output terminals, said output electrodes of said switching semiconductor and said resistor.

5. A cardiac Pacemaker according to claim 4 wherein said pulse generator includes an output switching semiconductor having a pair of output electrodes connected between a ground potential and one side of said capacitor.

6. A cardiac Pacemaker according to claim 1 wherein said pulse generator includes an oscillator semiconductor and a first timing circuit coupled to said oscillator semiconductor for determining the first frequency rate of generated pulses and wherein said runaway inhibit means includes a switching semiconductor having a pair of output electrodes and a second timing circuit coupled between said switching semiconductor and said pulse generator, the output electrodes of said switching semiconductor being connected between said power supply and said first timing circuit.

7. A cardiac Pacemaker according to claim 6 wherein the time constant of said second timing circuit delays the application of voltage upon said first timing circuit by a predetermined time period.

8. A cardiac Pacemaker according to claim 1 wherein said runaway inhibit means including a timing circuit having a fixed time interval approximately equal to the period of said second predetermined frequency.

9. A cardiac Pacemaker according to claim 1 wherein said runaway inhibit means reduces the frequency of the pulses appearing at said output terminals below the frequency of said pulse generator when the frequency of said pulse exceeds said first frequency.

10. A cardiac Pacemaker according to claim 1 including a capacitor connected aross said power supply.

11. A cardiac Pacemaker according to claim 1 wherein said pulse generator, said power supply and said runaway inhibit means are enveloped in a moisture-proof and reaction-free material, whereby the entire cardiac Pacemaker can be implanted within a patient's body.

12. A cardiac Pacemaker according to claim 1 wherein said runaway inhibit means includes a switching transistor having a high impedance and a low impedance state, a capacitor, and a resistor connected in series with said capacitor and having a selected time constant, and circuit means connecting said capacitor and said resistor to said switching transistor and to said pulse generator for cyclicly controlling said switching transistor between high impedance and low impedance states.

13. A cardiac Pacemaker according to claim 12 wherein said switching transistor is connected to said power supply, said power supply charging said capacitor when said switching transistor is in a low impedance state, and said capacitor being discharged through said resistor when said switching transistor is in a high impedance state.

References Cited

UNITED STATES PATENTS

| | | | |
|---|---|---|---|
| 3,241,556 | 3/1966 | Facouto | 128—421 |
| 3,253,596 | 5/1966 | Keller | 128—421 |

FOREIGN PATENTS 826,766 1/1960 Great Britain.

OTHER REFERENCES

Cobbold et al.: "Medical Electronics and Biological Engineering," vol. 3, No. 3, July 1965, pp. 273–277.

RICHARD A. GAUDET, *Primary Examiner.*

W. E. KAMM, *Examiner.*